US007976916B2

(12) United States Patent
Riblier et al.

(10) Patent No.: US 7,976,916 B2
(45) Date of Patent: Jul. 12, 2011

(54) REFRIGERATED DISPLAY CASE HAVING A TRANSPARENT INSULATING GLAZING UNIT

(75) Inventors: Luc-Michel Riblier, Bussy Saint-Georges (FR); Hélène Grussaute Nghiem, Arsy (FR); Rino Messere, Modave (BE); Anne-Sophie Hebert, Compiegne (FR); Jean-Michel Florentin, Soissons (FR)

(73) Assignee: Saint-Gobain Vitrage, Coubevoie (FR)

( * ) Notice: Subject to any disclaimer, the term of this patent is extended or adjusted under 35 U.S.C. 154(b) by 1574 days.

(21) Appl. No.: 11/137,373

(22) Filed: May 26, 2005
(Under 37 CFR 1.47)

(65) Prior Publication Data

US 2006/0005484 A1 Jan. 12, 2006

Related U.S. Application Data

(63) Continuation-in-part of application No. 09/926,609, filed as application No. PCT/FR00/01424 on May 25, 2000, now Pat. No. 7,003,920.

(30) Foreign Application Priority Data

May 25, 1999 (FR) ..................................... 99 06586

(51) Int. Cl.
*B32B 1/08* (2006.01)

(52) U.S. Cl. ..................................... 428/34.7; 428/34.1

(58) Field of Classification Search ................. 428/34.1, 428/34.7

See application file for complete search history.

(56) References Cited

U.S. PATENT DOCUMENTS

| | | | |
|---|---|---|---|
| 3,992,171 | A | 11/1976 | Jenewein |
| 4,024,494 | A | 5/1977 | Quesnel |
| 4,053,972 | A | 10/1977 | Kordes |
| 4,134,626 | A | 1/1979 | Kordes |
| 4,206,615 | A | 6/1980 | Sobajima et al. |
| 4,477,129 | A | 10/1984 | Heaney |
| 4,478,909 | A | 10/1984 | Taniguchi |
| 4,583,796 | A | 4/1986 | Nakajima et al. |
| 4,656,781 | A | 4/1987 | Niekrasz et al. |
| 4,691,486 | A | 9/1987 | Niekrasz |
| 4,767,671 | A | 8/1988 | Parker |
| 4,859,532 | A | 8/1989 | Oyama et al. |
| 5,117,587 | A | 6/1992 | Doan |
| 5,157,940 | A | 10/1992 | Bertu et al. |
| 5,210,169 | A | 5/1993 | Muhlebach |

(Continued)

FOREIGN PATENT DOCUMENTS

EP 0 036 657 9/1981

(Continued)

OTHER PUBLICATIONS

Merrian-Webster; "Definition of frost"; http://www.merriam-webster.com/dictionary/frost; 2008.*

(Continued)

*Primary Examiner* — Rena L Dye
*Assistant Examiner* — James Yager
(74) *Attorney, Agent, or Firm* — Jeffrey S. Melcher; Manelli Denison & Selter, PLLC

(57) ABSTRACT

A refrigerated display case having a transparent insulating glazing unit for displaying cold or frozen products. The glazing unit has an antifrosting absorbent layer that inhibits the formation of visible condensation or frost.

33 Claims, 1 Drawing Sheet

U.S. PATENT DOCUMENTS

| | | | | |
|---|---|---|---|---|
| 5,262,475 | A | 11/1993 | Creasy | |
| 5,324,573 | A | 6/1994 | Evans | |
| 5,449,885 | A | 9/1995 | Vandecastele | |
| 5,476,682 | A | 12/1995 | Evans | |
| 5,584,143 | A | 12/1996 | Kennedy | |
| 5,753,373 | A | 5/1998 | Scholz | |
| 5,766,739 | A | 6/1998 | Funaki | |
| 5,778,689 | A | 7/1998 | Beatenbough | |
| 5,784,896 | A | 7/1998 | Tronnes et al. | |
| 5,852,284 | A | 12/1998 | Teder et al. | |
| 5,873,931 | A * | 2/1999 | Scholz et al. | 100/13 |
| 5,877,254 | A | 3/1999 | La Casse | |
| 5,962,090 | A | 10/1999 | Trautz | |
| 6,052,965 | A | 4/2000 | Florentin | |
| 6,094,306 | A | 7/2000 | Jain | |
| D430,174 | S | 8/2000 | Negrao et al. | |
| 6,144,017 | A | 11/2000 | Milett et al. | |
| 6,148,563 | A | 11/2000 | Roche et al. | |
| 6,164,739 | A | 12/2000 | Schulz et al. | |
| 6,185,948 | B1 | 2/2001 | Niki et al. | |
| 6,223,414 | B1 * | 5/2001 | Hodek et al. | 29/527.1 |
| 6,238,755 | B1 | 5/2001 | Harvey et al. | |
| 6,260,255 | B1 | 7/2001 | Richardson et al. | |
| 6,303,225 | B1 | 10/2001 | Veerasamy | |
| 6,362,414 | B1 | 3/2002 | Fujisawa et al. | |
| 6,367,223 | B1 | 4/2002 | Richardson et al. | |
| 6,394,613 | B1 | 5/2002 | Hatakeyama | |
| 6,401,399 | B1 | 6/2002 | Roche et al. | |
| 6,401,428 | B1 | 6/2002 | Glover et al. | |
| 6,540,884 | B1 | 4/2003 | Siddle | |
| 6,606,832 | B2 | 8/2003 | Richardson et al. | |
| 6,606,833 | B2 | 8/2003 | Richardson et al. | |
| 6,866,936 | B2 | 3/2005 | Opolski | |
| 2002/0073645 | A1 | 6/2002 | Richardson et al. | |
| 2002/0078654 | A1 | 6/2002 | Richardson et al. | |
| 2003/0062813 | A1 | 4/2003 | Cording | |
| 2003/0197449 | A1 | 10/2003 | Cording | |
| 2003/0203991 | A1 | 10/2003 | Schottman et al. | |
| 2003/0205059 | A1 | 11/2003 | Roche et al. | |
| 2004/0137155 | A1 | 7/2004 | Bernheim | |
| 2004/0194388 | A1 | 10/2004 | Roche | |
| 2004/0209019 | A1 | 10/2004 | Demars | |
| 2004/0222724 | A1 | 11/2004 | Cording | |
| 2005/0064101 | A1 | 3/2005 | Messere et al. | |

FOREIGN PATENT DOCUMENTS

| | | | |
|---|---|---|---|
| EP | 0 870 450 | A | 10/1998 |
| EP | 0 908 500 | A | 4/1999 |
| FR | 2 609 285 | | 7/1988 |
| GB | 2 199 360 | | 7/1988 |
| JP | 52 063186 | A | 5/1977 |
| JP | 57030823 | B4 | 7/1982 |
| JP | 59 021541 | A | 2/1984 |
| JP | 01 156390 | A | 6/1989 |
| JP | 02 110119 | A | 4/1990 |
| JP | 05222227 | A | 8/1993 |
| JP | 10 167764 | A | 6/1998 |
| JP | 11021511 | A2 | 1/1999 |
| JP | 11300269 | A2 | 11/1999 |
| JP | 2001294849 | A2 | 10/2001 |
| JP | 2002120818 | A2 | 4/2002 |
| JP | 2004143443 | A2 | 5/2004 |
| SU | 1 101 444 | A | 7/1984 |
| WO | WO 98/42163 | | 9/1998 |
| WO | WO 00/71481 | | 11/2000 |
| WO | WO 03/008877 | A2 | 1/2003 |
| WO | WO 2006/034068 | A2 | 3/2006 |

OTHER PUBLICATIONS

Hussman; "Always Clear"; Mar. 2004 (Document listed in IDS dated Sep. 26, 2005).*

* cited by examiner

REFRIGERATED DISPLAY CASE HAVING A TRANSPARENT INSULATING GLAZING UNIT

This application is a Continuation-in-Part of U.S. Ser. No. 09/926,609, Aug. 30, 2002, now U.S. Pat. No. 7,003,920, issued 28 Feb. 2006, the complete disclosure of which is incorporated herein by reference, which is a national stage entry under 35 U.S.C. 371 of International Application No. PCT/FR00/01424, filed 25 May 2000, now abandoned, designating the U.S. This application claims foreign priority under 35 U.S.C. 119 and 365 to French Patent Application No. 99 06586, filed 25 May 1999.

FIELD OF THE INVENTION

The invention relates to a refrigerated display case, more particularly a self serve merchandiser, having a transparent insulating glazing unit for displaying cold or frozen products, for example, food products, non-food items requiring refrigeration such as, drinking water, beverages, flowers and pharmaceuticals.

BACKGROUND OF THE INVENTION

When food products kept in a refrigerated self serve merchandiser have to remain visible for the consumers, as is the case in numerous commercial premises at the present time, the refrigerated merchandiser is preferably equipped with transparent glazing unit in order to save energy costs. These refrigerated self serve merchandisers exist in many various forms. When these merchandisers are vertical, then it is the door itself which contains the transparent glazing unit. When these merchandisers are horizontal and constitute chests, then it is the horizontal lid door which contains the transparent glazing unit to allow the contents to be seen. The refrigerated merchandiser is also commonly referred to as a refrigerated display case.

In these types of merchandisers, it is necessary that the food products remain easily visible to the customers so that the products can be preselected without opening the merchandiser.

However, one of the main problems encountered with these merchandisers is the condensation that builds up on the exterior surface of the glazing unit facing the ambient atmosphere. What happens is that this exterior surface is cooled by the refrigerated environment on the opposite side of the glazing unit. When the temperature of this exterior surface is at a temperature below the dew point, visible condensation occurs in form of droplets, which makes the food products on display barely visible.

Another significant problem is the formation of visible condensation, or even frost, on the interior surface of the glazing unit when the door of the display case is opened in order to take the food products out. What happens is that the inside surface of the glazing unit, which is at a very low temperature, often times below 0° C., contacts the ambient atmosphere, which is far more loaded with moisture and at a far higher temperature. The temperature of this interior surface is usually then below the dew point, which causes visible condensation to form on the surface. This condensation can even turn to frost when the temperature of this surface is below 0° C. or 32° F. The presence of condensation or frost makes a visible barrier between the consumers and the food products, and it then takes several minutes or even several tens of minutes, for this condensation or the frost to completely disappear. When the food products are not easily visible, impulse sales are lost and customers open the doors for longer periods of time to select the food products, which causes the refrigeration unit to run longer to maintain the temperature of the goods and generates at the same time more condensation or frost that will require more time to disappear.

The use of performing insulating glazing units in refrigerated display cases has been avoided since it exacerbates the problem of condensation or frost forming on the surface of the glazing unit facing the interior of the merchandiser. When the insulation is performing, then the inside surface is cooler and the cooler the surface the greater the problem of condensation or frosting when the door is opened.

Heating means are commonly used to reduce the problem of condensation or 0 frost forming on the surface of the glazing unit facing the interior of the merchandiser. See, for example, U.S. Pat. Nos. 5,449,885, 5,852,284, and 6,144,017, which all disclose the use of heating means. However, the use of heating means consumes significant quantities of electricity, first to generate the heat and second to compensate through the refrigeration unit for the heat that is transferred inside the merchandiser. And despite this, depending on the ambient conditions and the power of these heated means, condensation or frost can still occur and the benefit of the heated means is then only to rapidly remove condensation or frost in a short period (generally less than 2 minutes).

Furthermore, while the use of insulating glazing units in combination with heating means has been disclosed in these patents, the various functional layers used previously, including the low-emission coatings, disclosed in these patents substantially reduce the light transmission ratios of the glazing units so that additional lighting power is often required inside the merchandiser to compensate and to see the food products on display. This additional lighting generates additional heat, which can increase the temperature of the products on display in the merchandiser and requires additional power consumption by the corresponding refrigeration unit.

In light of rising energy costs, there is a great need for an environmentally friendly refrigerated merchandiser having an insulating transparent glazing unit that does not require powerful interior lighting or heating means to avoid visible condensation or frost formation on the exposed surfaces of the glazing unit.

SUMMARY OF THE INVENTION

An objective of the invention is to provide a refrigerated display case having an insulating glazing unit that inhibits the formation of visible condensation or frosting on both the surface of the glazing unit facing the interior of the display case and the surface of the glazing unit facing the exterior of the display case, without relying on the use of heating means.

A further object of the invention is to provide an insulating glazing unit having improved thermal properties for use in a refrigerated display case, which avoids visible formation of condensation or frost, even under difficult conditions of vastly different exterior and interior environments, and the length of time for which it is open for taking out products or restocking, and which performs well in terms of energy saving and allows the products arranged in the display case to be seen clearly and easily.

The above objects and other objects are met by a refrigerated display case comprising:

a refrigerated enclosure constructed and arranged to contain cold or frozen products;

a door constructed and arranged to seal the refrigerated enclosure when in a closed position, the door having a transparent insulating glazing unit comprising at least two glass substrates; and an antifrosting adsorbent layer disposed on a surface of a glass substrate facing an interior of the refrigerated enclosure and formed from at least one hydrophilic polymer, wherein the transparent insulating glazing unit inhibits the formation of condensation on a surface of the glass substrate in contact with the ambient atmosphere and the antifrosting adsorbent layer inhibits the formation of water crystals on the surface of the glass substrate facing the interior of the refrigerated enclosure when the door is opened.

These objects are also obtained by a refrigerated display case comprising:

a refrigerated enclosure constructed and arranged to contain cold or frozen products;

a door constructed and arranged to seal the refrigerated enclosure when in a closed position, the door having a transparent insulating glazing unit comprising at least two glass substrates; and an antifrosting adsorbent layer disposed on a surface of a glass substrate facing an interior of the refrigerated enclosure, the antifrosting adsorbent layer being further an absorbent layer which is porous to allow condensation to absorb therein, wherein the transparent insulating glazing unit inhibits the formation of condensation on a surface of the glass substrate in contact with the ambient atmosphere and the antifrosting adsorbent layer inhibits the formation of water crystals on the surface of the glass substrate facing the interior of the refrigerated enclosure when the door is opened.

These objects are also met by a transparent insulating glazing unit constructed and arranged for use in a refrigerated display case, the transparent insulating glazing unit comprising:

at least two glass substrates bound together by a spacer; and an antifrosting adsorbent layer disposed on an exterior surface of a glass substrate constructed and arranged to contact an interior of a refrigerated display case when the glazing unit is mounted in a door and the door is in a closed position on the display case, the antifrosting adsorbent layer being further an absorbent layer which is porous to allow condensation to absorb therein, wherein the transparent insulating glazing unit inhibits the formation of condensation on a surface of the glass substrate in contact with the ambient atmosphere and the antifrosting adsorbent layer inhibits the formation of water crystals on the surface of the glass substrate facing the interior of the refrigerated enclosure during use on the refrigerated display case.

The objects are further obtained by an insulating glazing unit for a door of a refrigerated display case comprising three glass substrates, a first glass substrate having an external surface of which is in contact with an interior of a o refrigerated enclosure when the glazing unit is mounted in the door and the door is in a closed position, a second glass substrate, and a third glass substrate the external surface of which is in contact with the ambient environment when the glazing unit is mounted in the door, the three substrates being separated from one another by a spacer of low thermal conductivity, a low-emission coating being disposed on at least in part on one of the surfaces of the glass substrates, and an antifrosting adsorbent layer for inhibiting the formation of condensation and frost being disposed on at least part of the external surface of the first glass substrate, wherein the thickness of the substrates is between 2 and 5 mm, at least one space between the substrates is filled with at least one rare gas, a thickness of the space between the substrates is at least 4 mm, a spacer for bonding the substrates together has a thermal conductivity of less than 1 W/m.K, the glazing unit has no heating element, the glazing unit has a thermal conductivity coefficient U of less than 1.1 W/m$^2$.K, with at least 85% gas filling, and the glazing unit has a light transmission ratio of at least 67% and an external light reflection factor of below 18%.

These objects are also obtained by an insulating glazing unit for a door of a refrigerated display case comprising two glass substrates, a first substrate the external surface of which is in contact with an inside of the display case when the glazing unit is mounted in the door and the door is in a closed position, and a second substrate the external surface of which is in contact with the ambient environment, which substrates are separated from one another by a spacer of low thermal conductivity, the space between the substrates being filled with a rare gas, a low-emission coating being deposited at least in part on one of the surfaces of the substrates, and an antifrosting adsorbent layer for inhibiting the formation of condensation and frost being disposed on at least part of a surface of the first glass substrate intended to be in contact with an interior of the refrigerated display case, wherein the thickness of the substrates is from 2 to 5 mm, the space between the substrates is filled with krypton or xenon, the thickness of the layer of krypton or of xenon is at least 8 mm, and the spacer has a thermal conductivity of less than 1 W/m.K, the glazing unit has no heating element, the glazing unit has a thermal conductivity coefficient U of less than 1.15 W/m$^2$.K, with at least 85% gas filling, and the glazing unit has a light transmission ratio of at least 75% and an external light reflection factor of below 12%.

In the remainder of the description interior and exterior will be used to qualify elements which face towards the inside or, respectively, the outside of the refrigerated cabinet when the door is in the closed position.

Internal and external will be used to qualify elements which face towards the inside and, respectively, towards the outside of the insulating glazing unit.

DETAILED DESCRIPTION OF THE INVENTION

Figure 1:
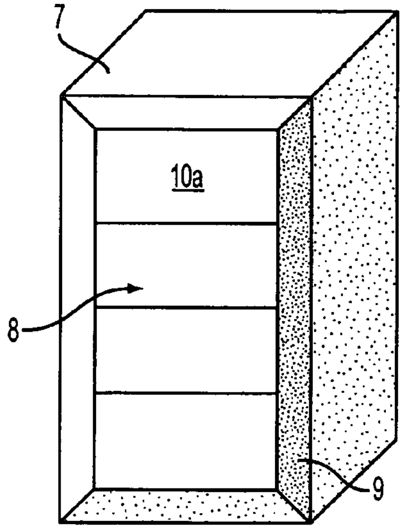
FIG. 1 illustrates a view of a refrigerated display according to the present invention.

The invention will now be explained with reference to the attached FIG.s without being limited thereto. FIG. 1 illustrates a view of a refrigerated display case 7 comprising a refrigerated enclosure 8 and a door 9 for sealing the refrigerated enclosure 8 when the door 9 is in a closed position. The door 9 comprises a transparent insulating glazing unit 10$a$. The glazing unit 10$a$ has an antifrosting adsorbent layer deposited on the surface of the glazing unit 10$a$ facing the interior of the refrigerated enclosure 8.

Such a glazing unit, especially when it is an insulating glazing unit, and more particularly a vacuum insulating glazing unit, can be used in a door of a refrigerated enclosure having at least one viewing area consisting, for example, of the said vacuum insulating glazing unit combined with an antifrosting adsorbent layer advantageously deposited on that surface of the said viewing area which is in contact with the refrigerated environment.

It has been shown that such a door, comprising the glazing unit according to the invention, makes it possible to prevent the frosting phenomenon, or more 0 precisely to delay it or at the very least limit its appearance.

According to a first embodiment, the antifrosting adsorbent layer is deposited directly on the glass substrate, and more specifically on that surface of the vacuum insulating glazing unit which is in contact with the refrigerated environment. This is the surface in contact with the refrigerated environment when the door is in its closed position. Such a layer may be deposited by techniques of the sputtering or coating type, especially of the flow-coating or deep-coating type, the deposition being carried out before or after manufacturing of the vacuum glazing unit. Advantageously, an adhesion primer of the silane type is provided; it is either deposited beforehand on the glass or at the same time as the layer is formed, the silanes being introduced into the composition of the antifrosting adsorbent layer.

According to a second embodiment, the antifrosting adsorbent layer is deposited, for example according to one of the abovementioned methods, on a plastic film and the plastic film is itself fastened to the vacuum insulating glazing unit. The plastic film used is advantageously a polycarbonate film preferably having a thickness of less than 3 millimetres; this plastic is especially chosen for its mechanical strength properties. The plastic film is fastened to the glazing in a sealed manner so that no trace of moisture can exist between the glass surface and the plastic film. It may be fastened, for example, by adhesive bonding around the periphery; the air layer possibly existing between the glass and the plastic film must then advantageously not exceed 3 mm. The fastening may also be achieved by means of an aluminium frame combined with a desiccant and an adhesive, similar to that for an insulating glazing unit of conventional construction; advantageously, the air layer between the glass and the plastic film then does not exceed 10 mm.

According to an advantageous embodiment of the invention, the antifrosting adsorbent layer comprises at least one hydrophilic polymer. Such a polymer may be non-limitingly chosen from the following polymers: a polyvinylpyrrolidone of the poly(N-vinyl-2-pyrrolidone) or poly(1-vinylpyrrolidone) type, a polyvinylpyridine of the poly(N-vinyl-2-pyridine) type, of the poly(N-vinyl-3-pyridine) type or of the poly(N-vinyl-4-pyridine) type, a polyacrylate of the poly(2-hydroxyethyl acrylate) type, a polyacrylamide of the poly(N', N-hydroxyacrylamide) type, a polyvinyl acetate, a polyacrylonitrile, a polyvinyl alcohol, a polyacrolein, a polyethylene glycol or a polyoxyethylene. It may also be a copolymer based on two or more of the abovementioned polymers.

Preferably, the invention specifies that the layer consists of at least one crosslinked hydrophilic polymer. Crosslinking the polymer makes it possible, in particular, to obtain better cohesion of the layer and thus to prevent any risk of the layer being dissolved by water, over the long or short term.

According to a preferred embodiment of the invention, the hydrophilic polymer is combined with an organic or inorganic absorbent material, the said absorbent material preferably being porous.

An inorganic absorbent material especially improves the mechanical strength of the layer and more particularly prevents the formation of scratches. The inorganic function is advantageously achieved by depositing a mesoporous material (CPG-MCM 41), such as TiO.sub.2 nanoparticles, or by depositing orthosilicate hydrolysis condensation products, or other silicon derivatives.

An organic absorbent material especially allows retention of the hydrophilic polymer; a polyurethane is used, for example.

The inventors have thus been able to demonstrate that the presence of a porous layer which includes a hydrophilic polymer on the surface of the glazed area allows water to be adsorbed. This principle prevents the formation of water droplets and thus the formation of a film liable to frost over and affect visibility through the glazed area. The choice of hydrophilic polymer and of the porosity in the case of a porous absorbent material make it possible to control the antifrosting behaviour of the layer. In particular, increasing the porosity allows the rate of water absorption and the water absorptivity, as well as the level of water in microdroplet form, to be controlled.

According to a preferred embodiment of the invention, the porosity of the layer is between 0.1 and 1000 cm.sup.3/g. In the case of a polymeric material, it is advantageously between 0.1 and 100 $cm^3$/g and preferably less than 20 $cm^3$/g. It is preferably between 200 and 1000 $cm^3$/g in the case of a mesoporous material. The porosity defines the void volume of the pores per unit mass of the layer.

Also preferably, the layer has pores whose mean diameter is between 0.05 and 50 microns, preferably between 0.1 and 20 microns and more preferably between 1 and 15 microns. The shapes of the cavities making up the pores are oval or spherical.

Whatever the nature of the antifrosting adsorbent layer and the method of producing the latter, it advantageously has a thickness of less than 100 microns, preferably less than 50 microns and more preferably less than 35 microns and, in some cases, preferably less than 25 microns and more preferably less than 20 microns.

Further details and advantageous characteristics of the invention will emerge below from the description of illustrative examples of the invention and of tests carried out.

Figure 2:
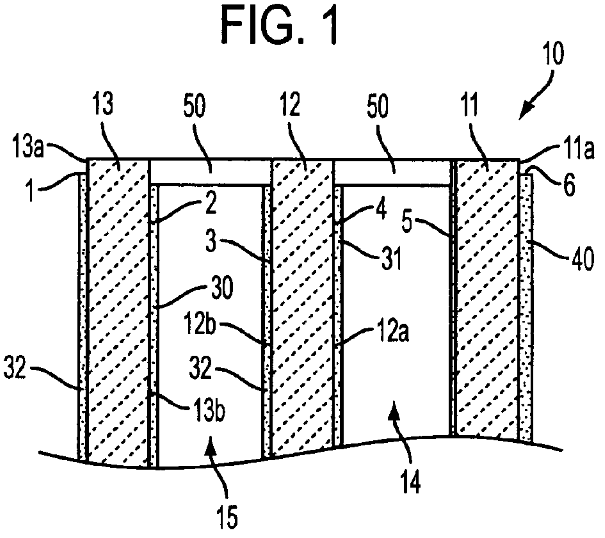
FIG. 2 illustrates a view of three glass panel glazing unit according to the present invention.
Figure 3:
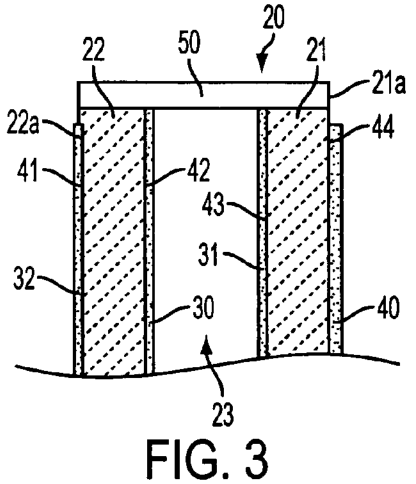
FIG. 3 illustrates a view of a two glass panel glazing unit according to the present invention.

Instead of using the exemplary vacuum insulating glazing unit described above, any other suitable insulating glazing unit may be utilized in combination with the novel antifrosting absorbent layer described herein, such as those shown in FIGS. 2 and 3.

FIG. 2 illustrates, according to a third embodiment of the invention, an insulating glazing unit 10 filled with gas, with no heating element, and comprising at least one low-emission coating 30 and one anti-frost coating 40, having a heat transfer coefficient U of less than 1.1 W/$m^2$.K and a light transmission ratio of at least 67%.

The insulating glazing unit 10 comprises three glass substrates, a first substrate or interior substrate 11, the external surface 11*a* of which is intended to be in contact with the inside of the cabinet when the door is in the closed position, a second substrate or intermediate substrate 12, and a third substrate or exterior substrate 13 the external surface 13*a* of which is intended to be in contact with the environment outside the cabinet. The first and third substrates 11 and 13 are preferably made of toughened glass.

The surfaces of the substrates are labelled from 1 to 6 and referenced (1) to (6) in FIG. 2 and correspond respectively to the external surface 13*a* (surface 1) intended to be in contact with the environment outside the cabinet to the surface 11*a* (surface 6) intended to be in contact with the inside of the cabinet when the door is in the closed position.

While thicker glass substrates can be utilized if desired, the thickness of each of the glass substrates is ideally between 2 and 5 mm to provide suitable weight and light transmission of the glazing unit, and is preferably 3 or 4 mm.

Preferably, the substrates are separated from one another by a spacer 50 having a low thermal conductivity. The spacer can be made up of two separate elements or a single element straddling the intermediate substrate. This spacer preferably has a thermal conductivity coefficient of at most 1 W/m.K (or 1.88 BTU/h.ft.F), preferably below 0.7 W/m.K, and even below 0.4 W/m.K. It is now well known that 0.534 W/m.K corresponds to 1 BTU/h.ft.F.

One example of spacer has a basic body made of a thermoplastic, for example of the styrene acrylonitrile (SAN) or polypropylene type, and reinforcing fibres, for example of the glass type, mixed into the thermoplastic, and a metal sheet providing tightness to gases and to water vapour. This metal sheet is bonded onto part of the basic body that is intended to face away from the interior space of the glazing unit. The basic body, which also includes a dehydratant, is deposited at the periphery and in the separating space, between the substrates using butyl. An additional sealing barrier against liquids and vapour, which seals the spacer and is made, for example, of polysulphide, polyurethane or silicone, is arranged on the same side as the metal sheet of the spacer.

Such a spacer, which is based on SAN and glass fibres, is known for example by the trade name SWISSPACER® by the company SAINT-GOBAIN GLASS when the metal sheet of the basic body is made of aluminium, and by the name SWISSPACER V® when the metal sheet of the basic body is made of stainless steel, and which in association with a double barrier of polysulphide has a thermal conductivity coefficient of 0.64 W/m.K (or 1.20 BTU/h.ft.F) in the case of SWISSPACER® and 0.25 W/m.K (or 0.47 BTU/h.ft.F) in the case of SWISSPACER V®.

It is also possible to mention by way of spacer the spacer described in application WO 01/79644, incorporated herein by reference, which is made of a more or less flat profile section arranged, not within the glazing unit but on the outside, secured to the edges of the substrates. This profile section may be made entirely of stainless steel or of aluminium or of fibre-reinforced plastic, its linear buckling strength being at least 400 N/m. The spacer is for example made of aluminium, 0.5 mm thick, and has a thermal conductivity coefficient of 0.25 W/m.K (or 0.47 BTU/h.ft.F). The spacer comprises a sealing barrier against gases, dust and liquids, and it has at least on the external surface a metallic coating. The metallic coating can be any metallic coating suitable for use as a sealing barrier against gases, dust and liquids.

The interior space between the interior substrate 11 and the intermediate substrate 12 comprises an interior layer of gas 14, and the space between the exterior substrate 13 and the intermediate substrate 12 comprises an exterior layer of gas 15. The thickness of the layers of gas and composition thereof are selected to provide a desired level of heat transfer coefficient U. For example, when a rare gas is utilized suitable thicknesses have been found to o be from 4 mm for reaching the desired coefficient U to preferably 16 mm for not having a too thick glazing unit and because beyond 16 mm, the coefficient U is not better. When air is used for one of layers of gas, the thickness is preferably at least 10 mm.

At least one of the layers of gas preferably comprises a rare gas chosen from argon, krypton or xenon, or even a mix of 2 or more gases from this list with a gas fill level of at least 85%. For a better value of coefficient U, it is preferable to have a gas fill level at least 92%, in particular for krypton or xenon. If desired, when there are more than one gas layers, one of the layers can comprise air.

The glazing unit comprises a low-emission coating 30 arranged on at least part of the surface 13*b* of the exterior substrate which faces the interior of the glazing (surface 2), and/or another low-emission coating 31 of the same type deposited on at least part of the surface 12*a* of the intermediate substrate which faces the interior substrate 11 (surface 4). When just one low-emission coating is provided, it is preferably disposed on the surface of the glazing unit associated to the thickest layer of gas.

The low-emission coatings are based on layers of metal and metal oxides, which can be obtained by various methods: by vacuum methods (thermal evaporation, cathode sputtering, magnetron sputtering) or thermal decomposition (CVD) of organo-metallic compounds propelled in liquid, solid or gaseous form by a carrier gas onto the surface of the heated substrate.

As a preference, the metallic layers are based on silver, and the layers of metal oxides are based on compounds of zinc, tin, titanium, aluminium, nickel, chromium, antimony (Sb), on nitrides or on a mixture of at least two of these compounds, and possible blocking layers such as a blocking metal or blocking metal alloy, of the Ti type, as a superlayer on the silver.

For examples, the following layers can be utilized for which the ($TiO_2$) reference means that it is an optional element:

$Glass/SnO_2/(TiO_2)/ZnO/Ag/Ti\mathit{ou}NiCr\mathit{ou}NiCrO_x/ZnO/SnO_2\mathit{ou}Si_3N_4/SnZnO_x{:}Sb\mathit{ou}TiO_x$ $Glass/SnO_2/TiO_2/ZnO/Ag/NiCrO_x/(TiO_2)/SnO_2/SnZnO_x{:}Sb$ For further details, particularly regarding alternative forms of embodiments, thicknesses, and quantities of compounds, reference may be made to patent applications FR 2783918 or EP1042247, which are incorporated herein by reference.

According to the invention, the type of coating allows a suitable compromise to be reached between the optical quality of the substrate, particularly regarding its light transmission ratio, and its ability to reflect in the infrared. The low-emission coating used in the display case of the invention has an emissivity of 0.3 or below, preferably of 0.05 or below, and a light transmission ratio higher than 75%, preferably higher than 85%.

Also, it is possible to use by way of a substrate provided with such a coating, the commercially available product PLANITHERM® FUTUR N by SAINT-GOBAIN GLASS which has, in glass 4 mm thick, an emissivity of 0.04 and a light transmission ratio of 88.4%.

Another product which can be used according to the invention is for example PLANITHERM® ULTRA of SAINT-GOBAIN GLASS which has, in glass 4 mm thick, an emissivity of 0.02 and a light transmission ratio of 86.7%. When this glass is used rather than the PLANITHERM® FUTUR N, the U coefficient is better but the glazing provides slightly less light transmission.

In addition, at least one anti-reflective coating 32 may be provided on one or several substrates, preferably on surface 1 and/or 3 and/or 5, and this has the advantage, besides its anti-reflection function, of improving the light transmission ratio of the glazing unit and of making the products in the display case even easier to see.

Finally, the glazing unit comprises an antifrosting absorbent layer 40 associated with the external surface 11*a* of the interior substrate 11. This antifrosting absorbent layer 40 may be a layer deposited directly on the substrate or deposited onto a plastic film secured to the substrate as described above. This antifrosting absorbent layer 40 is described above.

In this third embodiment of the invention, several alternative forms may be envisaged according to the desired performance for the heat transfer coefficient U, accompanied by a compromise regarding the bulkiness of the glazing unit, its weight and its optical qualities and cost.

FIG. 3 illustrates a fourth embodiment of the invention for which the door 9 (shown in FIG. 1) has an insulating double glazing unit 20 filled with xenon and/or krypton, with no heating element and comprising at least one low-emission coating 30 and one anti-frost coating 40. This double glazing unit has a heat transfer coefficient U of less than 1.15 $W/m^2$.K.

The double glazing unit 20 comprises two glass substrates 21 and 22, similar to those described above, intended respectively to be in contact with the interior environment of the refrigerated cabinet and with the exterior environment. They are spaced apart by a spacer 50 having a low thermal conductivity like the one described in the third embodiment. For example as shown on the FIG. 3, the spacer 50 is secured to the edges of the substrates 21 and 22.

The gas layer 23 of xenon and/or krypton between the two substrates is usually between 4 and 16 mm thick, and preferably has a thickness of at least 8 mm.

In this fourth embodiments, FIG. 3 shows the surfaces of the substrates labelled from 41 to 44, with 41 being the surface exposed to the ambient atmosphere and surface 44 exposed to the interior of the refrigerated display case when the door is closed. A low-emission coating 30 is arranged on at least an interior surface of the glazing unit, on surface 42 and/or on surface 43. The coating is of the type described in the third embodiment, based on silver and metal oxides.

The anti-frost coating 40 is deposited on the external surface 21*a* (also shown as 44) of the interior substrate and corresponds to the one described in the third embodiment.

An anti-reflective coating 32 may be provided on at least one of the substrates, preferably on surface 41 and/or 43 of the glazing unit.

EXAMPLES

The invention will now be described with reference to the following non-limiting examples.

As described above, a door for a refrigerated sales cabinet was produced. It consisted of a vacuum insulating glazing unit in order to form the viewing area and of a door frame, for example made of metal. This frame may especially support all the mechanical systems of the handle and hinge type, as well as the seals which seal against the walls of the refrigerated enclosure.

The insulating glazing unit consists of two glass sheets between which a vacuum has been created. The glass sheets are separated from each other by studs (spacer) distributed over the entire surface of the glazing and are joined together around their periphery by a seal of inorganic adhesive. Such a vacuum insulation glazing unit is, for example, produced according to a technique as described in Patent Application EP 645 516.

According to the invention, a polycarbonate film having a thickness of 2 millimetres is fastened to the vacuum insulating glazing unit by means of an adhesive forming a strip with a thickness of 1 millimetre around the periphery of the glazing. Thus, an air cavity is formed between the glazing and the completely sealed polycarbonate film. This complex is produced in such a way that the trapped air is dry. The film is fastened to that side of the vacuum insulating glazing unit which is intended to face the inside of the refrigerated enclosure when the door is in its closed position.

Before attaching it, the polycarbonate film is coated with an antifrosting adsorbent layer, this being deposited so as to face the inside of the refrigerated enclosure when the door is in the closed position. The layer thus deposited forms a polymeric porous three-dimensional network based on polyvinylpyrrolidone and polyurethane.

Measurements were carried out on the layer in the wet state using transmission electromicroscopy; these measurements allow the thickness of the layer and the size of the pores to be checked. The thickness of the layer is equal to 14.5 microns and the pores have a mean diameter varying from 1 to 8 microns.

Tests were carried out on various types of doors. These doors are fitted onto refrigerated sales cabinets within which a temperature of −28° C. is maintained. The cabinets themselves are placed in an atmosphere at a temperature of 25° C. The tests consist in opening the door for a period of 3 minutes and a period of 12 seconds. The 3-minute period simulates the average time needed for this type of cabinet to be stocked up in the morning. The 12-second duration simulates the average time needed for a consumer to take one or more products.

The measured results are the times needed for satisfactory visibility through the door to return, that is to say the times needed to remove the condensation and/or frosting.

The first door tested, A, has an insulating glazing unit consisting of three glass sheets. The second door tested, B, has a vacuum insulating glazing unit.

The third door, C, is that according to the invention that has just been described.

The results are given in Table I below:

TABLE I

| | 3-min opening | 12-s opening |
|---|---|---|
| A | 8 min 20 s | 1 min 15 s |
| B | 31 min 10 s | 1 min 40 s |
| C | 0 s | 0 s |

From these results it is clearly apparent that door C, produced according to the invention, prevents the formation of frosting.

Another test was carried out under similar conditions. Only the nature of the layer differs in this second example. This second example consisted in depositing a layer consisting only of a hydrophilic polymer; this hydrophilic polymer was based on polyvinylpyrrolidone, having a molecular mass of 1,300,000 g/mol and diluted to 10% by mass in ethanol. The composition thus obtained was then deposited on the glass by flow coating.

Tests such as those described above, consisting in opening the door for a period of 12 seconds and for 3 minutes, were carried out. In both cases, there was no sign of any frosting on the viewing area of the door.

The presence of the adsorbent layer therefore prevents the formation of frosting when the door is opened under normal operating conditions. Table II below summarizes several exemplary embodiments D to H of triple glazing units which meet the required thermal insulation and non-formation of mist and frost performances without the need to heat the glazing unit.

The results in Table II indicate the overall thickness of the glazing unit, the thicknesses of each glass substrate, the position of the low-emission coating(s), the thicknesses of the layers of gas, the type of gas, the corresponding light transmission ratio and external light reflection factor, and the heat transfer coefficient U obtained for the example with respect to the chosen gas and the gas fill level (85% and 92%), together with the global heat transfer coefficients Uw of the doors incorporating such glazing units.

For each of these examples:

the spacer of low thermal conductivity 50 was made of two distinct elements for each of the two spaces in the glazing unit; that were made of SAN and glass fibres with a stainless steel sheet as described above and marketed under the trade name SWISSPACER V® by the company SAINT-GOBAIN GLASS; the low-emission coatings 30 and 31 were deposited on glass substrates which correspond to the products PLANITHERM® FUTUR N by SAINT-GOBAIN GLASS, except for the example D1 which corresponds to the example D for which one of substrates was replaced by the product PLANITHERM® ULTRA by SAINT-GOBAIN GLASS of which the specificities are described above; the anti-frost coating 40 was deposited directly onto the glass substrate; this is the EVERCLEAR® coating marketed by SAINT-GOBAIN GLASS; the anti-reflective coatings 32 were deposited on glass substrates and correspond to the products Vision-Life Plus® by SAINT-GOBAIN GLASS.

The heat transfer coefficient U was calculated at the center of the glazing unit and in accordance with the standards prEN 673 and prEN 410; hence, this calculation was independent of the type of spacer.

The global heat transfer coefficient Uw of the door was calculated for glazing units incorporated in an aluminium frame with thermal breaker bridge and incorporated in a PVC frame. These values were calculated according to the standard EN ISO 10077-2 in taking the sizes of the door, the glazing unit, the frame and the type of frame and of spacer into account.

The door was 1800 mm×800 mm. The frame had a squared profile of 40 mm×40 mm with a heat transfer coefficient U equal to 2.6 W/m$^2$.K for aluminium and 1.8 W/m$^2$.K for PVC. The glazing unit was incorporated in the groove of the frame on a 25 mm depth.

TABLE II

| | Embodiment | | | | | | | |
|---|---|---|---|---|---|---|---|---|
| | D | D1 | E | E1 | E2 | F | G | H |
| Overall thickness (mm) | 29 | 29 | 29 | 29 | 29 | 29 | 35 | 35 |
| Thickness of the exterior substrate (mm) | 4 | 4 | 4 | 4 | 4 | 4 | 4 | 4 |
| Thickness of the middle substrate (mm) | 4 | 4 | 4 | 4 | 4 | 4 | 4 | 4 |
| Thickness of the interior substrate (mm) | 3 | 3 | 3 | 3 | 3 | 3 | 3 | 3 |
| Layer surface 1 | — | — | — | — | — | — | — | Anti-reflective |
| Layer surface 2 | Low-emission | Low-emission | Low-emission | Low-emission | Low-emission | Low-emission | Low-emission | Low-emission |
| Layer surface 3 | — | | — | — | | — | — | Anti-reflective |
| Layer surface 4 | Low-emission | PLANITHERM ® ULTRA low-emission | Low-emission | | Low-emission | Low-emission | Low-emission | Low-emission |
| Layer surface 5 | — | — | — | — | | — | — | Anti-reflective |
| Layer surface 6 | Anti-frost | Anti-frost | Anti-frost | Anti-frost | Anti-frost | Anti-frost | Anti-frost | Anti-frost |
| Thickness of the exterior gas layer (mm) | 8 | 8 | 8 | 8 | 8 | 8 | 8 | 8 |
| Type of gas in exterior layer | Argon | Argon | Krypton | Krypton | Krypton | Krypton | Argon | Argon |
| Thickness of interior gas layer (mm) | 10 | 10 | 10 | 10 | 4 | 10 | 16 | 16 |
| Type of gas in interior layer | Argon | Argon | Krypton | Krypton | Krypton | Air | Argon | Argon |
| Light transmission ratio (%) | 71.2 | 69.9 | 71.2 | 72.4 | 71.2 | 71.2 | 71.2 | 79.8 |
| External light reflection factor (%) | 15.5 | 16.8 | 15.5 | 17.4 | 15.5 | 15.5 | 15.5 | 7.2 |
| Coefficient U with gas fill level 85% (W/m$^2$ · K) | 0.96 | 0.93 | 0.69 | 1.04 | 0.93 | 0.90 | 0.79 | 0.79 |
| Coefficient U with gas fill level 92% (W/m$^2$ · K) | 0.93 | 0.91 | 0.64 | 0.98 | 0.86 | 0.86 | 0.77 | 0.77 |
| Global coefficient Uw with gas fill level 92% in aluminium frame (W/m$^2$ · K) | 1.16 | 1.14 | 0.89 | 1.21 | 1.09 | 1.09 | 1.01 | 1.01 |

TABLE II-continued

| | Embodiment | | | | | | | |
|---|---|---|---|---|---|---|---|---|
| | D | D1 | E | E1 | E2 | F | G | H |
| Global coefficient Uw with gas fill level 92% in PVC frame ($W/m^2 \cdot K$) | 1.10 | 1.08 | 0.83 | 1.15 | 1.04 | 1.04 | 0.95 | 0.95 |

These glazing units thus had a heat transfer coefficient U of below 1.1 $W/m^2$.K with a gas fill level of 85%, and even below 0.80 $W/m^2$.K when argon was used with a gas fill level of at least 92% and with a thickness of 16 mm for one of the layers of gas (Examples G and H), and preferably below 0.65 $W/m^2$.K with krypton for both layers of gas (Example E).

The global heat transfer coefficient Uw of the door in which such glazing units were incorporated thus was below or equal to 1.25 $W/m^2$.K with a gas fill level of at least 92%.

These glazing units thus make it possible to obtain a light transmission ratio of at least 67% and an external light reflection factor of below 18%.

For the example D1, as described above, the use of a low emission glass substrate PLANITHERM® ULTRA provided, compared with the example D, an increasing of thermal insulating performances although the glazing unit in other respects lost a bit in optical quality while retaining nevertheless very reasonably good values.

The use of an anti-reflective layer, for example, on surfaces 1, 3 and 5 (Example H) results in an overall transmission ratio of 79.8% with a light reflection factor reduced to 7.2%, providing the glazing with excellent optical qualities.

The example F using only one layer of krypton may be desired compared to example E if cost is a concern because krypton is an expensive gas.

The glazing unit of example F provided good thermal insulating performances even though it only utilized one layer of krypton.

Furthermore, this example F shows the case for which if a complete leak of gas should happen for one of the gas layers in a glazing originally made according to E.

It is estimated that, over the course of time, the loss of gas can be as much as 1% per year for a glazing unit (standard prEN 1279-3). Hence, after several years, a glazing unit will see a drop in its gas fill level and its thermal insulation performance will therefore also drop. The row showing the coefficient U with a 85% gas fill level simulates in this respect the thermal performance of a glazing originally filled with a 92% gas fill level after at least 7 years.

Table III below illustrates three Examples I, J and J of a double glazing unit according to the invention. The heat transfer coefficient U was calculated at the center of the glazing unit and in accordance with the standard prEN 673 and prEN 410; hence, this calculation was independent of the type of spacer.

The low-emission coating corresponds to the PLANITHERM® FUTUR N by SAINT-GOBAIN GLASS. The anti-frost coating corresponds to EVERCLEAR® by SAINT-GOBAIN GLASS, and the anti-reflective coating corresponds to Vision-Lite Plus® by SAINT-GOBAIN GLASS.

As explained above for triple glazing units, the global heat transfer coefficient Uw of the door in which these double glazing units have been incorporated has been calculated according to the same way with the same sizes and type of spacer and frame.

TABLE III

| | Embodiment | | |
|---|---|---|---|
| | I | J | K |
| Total thickness (mm) | 16 | 16 | 18 |
| Thickness of exterior substrate (mm) | 4 | 4 | 4 |
| Thickness of interior substrate (mm) | 4 | 4 | 4 |
| Thickness of the gas layer (mm) | 8 | 8 | 10 |
| Layer surface 1 | — | Anti-reflective | — |
| Layer surface 2 | Low-emission | Low-emission | Low-emission |
| Layer surface 3 | Low-emission | Low-emission | Low-emission |
| Layer surface 4 | Anti-frost | Anti-frost | Anti-frost |
| Layer surface 5 | — | | — |
| Thickness of the gas layer (mm) | 8 | 8 | 10 |
| Type of gas in exterior layer | Xenon | Xenon | Krypton |
| Light transmission ratio (%) | 78.4 | 81.5 | 78.4 |
| External light reflection factor (%) | 9.6 | 6.0 | 9.6 |
| Coefficient U with gas fill level of 85% ($W/m^2 \cdot K$) | 1.12 | 1.12 | 1.08 |
| Coefficient U with gas fill level of 92% ($W/m^2 \cdot K$) | 0.99 | 0.99 | 1.01 |
| Global coefficient Uw with gas fill level of 92% ($W/m^2 \cdot K$) with aluminium frame | 1.22 | 1.22 | 1.23 |
| Global coefficient Uw with gas fill level of 92% ($W/m^2 \cdot K$) with PVC frame | 1.16 | 1.16 | 1.18 |

These glazing units, when designed for slim doors have a small overall thickness and, thus, have a heat transfer coefficient U below 1.15 $W/m^2$.K for 85% gas filling and below of 1.05 $W/m^2$.K for at least 92% gas filling. And the doors present a global heat transfer coefficient Uw below of 1.20 $W/m^2$.K for at least 92% gas filling for a PVC frame and below of 1.25 $W/m^2$.K for at least 92% gas filling for an aluminium frame.

These glazing units, thus, make it possible to obtain a light transmission ratio of at least 75% and an external light reflection factor of below 12%.

The light transmission ratio for Examples I and K is 78.4% and advantageously increases to 81.5% when anti-reflective coatings are added, with external light reflection factors of 9.6% and 6.2% respectively.

Thus, the glazing units according to the third and fourth embodiments of the invention meet the classes 2, 3, 4 and 5 of environment given in standard EN441, and summarized in Table IV below, and particularly meet the class 6 when the heat transfer coefficient U is below 0.8 such as with examples E, G and H.

TABLE IV

| Class of environment In accordance with standard EN441 | Temperature outside the cabinet ° C. | Relative humidity outside the cabinet % | Dew point ° C. |
|---|---|---|---|
| 2 | 22 | 65 | 15.1 |
| 3 | 25 | 60 | 16.7 |
| 4 | 30 | 55 | 20.0 |
| 5 | 40 | 40 | 23.8 |
| 6 | 27 | 70 | 21.1 |

While the claimed invention has been described in detail and with reference to specific embodiments thereof, it will be apparent to one of ordinary skill in the art that various changes and modifications can be made to the claimed invention without departing from the spirit and scope thereof.

The invention claimed is:

1. A refrigerated display case comprising:

a refrigerated enclosure constructed and arranged to contain cold or frozen products;

a door constructed and arranged to seal the refrigerated enclosure when in a closed position, the door having a transparent insulating glazing unit comprising at least two glass substrates; and an antifrosting adsorbent layer disposed on a surface of a glass substrate facing an interior of the refrigerated enclosure and formed from at least one hydrophilic polymer, wherein the transparent insulating glazing unit inhibits the formation of condensation on a surface of the glass substrate in contact with the ambient atmosphere and the antifrosting adsorbent layer inhibits the formation of water crystals on the surface of the glass substrate facing the interior of the refrigerated enclosure when the door is opened, wherein the hydrophilic polymer is combined with an organic or inorganic absorbent material.

2. A refrigerated display case according to claim 1, wherein the hydrophilic polymer is crosslinked.

3. A refrigerated display case according to claim 1, wherein the hydrophilic polymer is selected from the group consisting of a polyvinylpyrrolidone of a poly(N-vinyl-2-pyrrolidone) or poly(1-vinylpyrrolidone) polymer, a polyvinylpyridine of a poly(N-vinyl-2-pyridine) polymer, of a poly(N-vinyl-3-pyridine) polymer or of a poly(N-vinyl-4-pyridine) polymer, a polyacrylate of a poly(2-hydroxyethyl acrylate) polymer, a polyacrylamide of a poly(N',N-hydroxyacrylamide) polymer, a polyvinyl acetate, a polyacrylonitrile, a polyvinyl alcohol, a polyacrolein, a polyethylene glycol or a polyoxyethylene, and copolymers based on two or more of the polymers listed.

4. A refrigerated display case according to claim 1, wherein the hydrophilic polymer combined with an organic or inorganic absorbent material forms a polymeric porous three-dimensional network.

5. A refrigerated display case according to claim 4, wherein the hydrophilic polymer combined with an organic or inorganic absorbent material comprises polyvinylpyrrolidone and polyurethane.

6. A refrigerated display case according to claim 1, wherein the absorbent material is porous.

7. A display case according to claim 6, wherein the porous absorbent material has a porosity of between 0.1 and 1000 $cm^3/g$, and a mean diameter of pores between 0.05 and 50 microns.

8. A refrigerated display case according to claim 7, wherein the porous absorbent material has porosity between 200 and 1000 $cm^3/g$ when the material is a mesoporous.

9. A refrigerated display case according to claim 6, wherein the porous absorbent material comprises at least one material selected from the group consisting of mesoporous materials, orthosilicate hydrolysis condensation products, and silicon derivatives.

10. A refrigerated display case according to claim 6, wherein the porous absorbent material is a polymeric material.

11. A refrigerated display case according to claim 6, wherein the porous absorbent material has porosity between 0.1 and 100 $cm^3/g$ when the material is a polymeric material.

12. A refrigerated display case according to claim 11, wherein the porous absorbent material has porosity between 0.1 and 20 $cm^3/g$.

13. A refrigerated display case according to claim 1, wherein the transparent insulating glazing unit comprises two glass substrates having a vacuum between the two glass substrates.

14. A refrigerated display case according to claim 1, wherein the thickness of the antifrosting adsorbent layer is less than 100 microns.

15. A refrigerated display case according to claim 1, wherein the thickness of the antifrosting adsorbent layer is less than 50 microns.

16. A refrigerated display case according to claim 1, wherein the thickness of the antifrosting adsorbent layer is less than 35 microns.

17. A refrigerated display case according to claim 1, wherein the thickness of the antifrosting adsorbent layer is less than 25 microns.

18. A refrigerated display case according to claim 1, wherein the thickness of the antifrosting adsorbent layer is less than 20 microns.

19. A refrigerated display case according to claim 7, wherein the mean diameter of the pores of the absorbent material is between 0.1 and 20 microns.

20. A refrigerated display case according to claim 7, wherein the mean diameter of the pores of the absorbent material is between 1 and 15 microns.

21. A refrigerated display case according to claim 1, wherein the antifrosting adsorbent layer is disposed on one side a polycarbonate film and another side of the polycarbonate film is bonded to the glass substrate.

22. A refrigerated display case according to claim 1, wherein the insulating glazing unit and antifrosting coating are constructed and arranged such that when a temperature of −28° C. is maintained within the refrigerated enclosure and an ambient temperature is 25° C. no visible frost or condensation forms after 12 seconds of the door being in an open position.

23. A refrigerated display case according to claim 1, wherein the insulating glazing unit comprises three glass substrates.

24. A refrigerated display case according to claim 1, further comprising a low-emission coating disposed on at least one surface of said glass substrates.

25. A refrigerated display case according to claim 23, further comprising a low-emission coating disposed on at least one surface of said glass substrates.

26. A refrigerated display case according to claim 24, further comprising at least one gas disposed between the glass substrates, said gas being selected from the group consisting of argon, krypton and xenon.

27. A refrigerated display case according to claim 25, further comprising at least one gas disposed between at least two of the glass substrates, said gas being selected from the group consisting of argon, krypton and xenon.

28. A refrigerated display case according to claim 26, the insulating glazing unit has a thermal conductivity coefficient U of less than 1.15 $W/m^2.K$, with at least 85% of said gas filling, a light transmission ratio of at least 75% and an external light reflection factor of below 12%.

29. A refrigerated display case according to claim 27, the insulating glazing unit has a thermal conductivity coefficient U of less than 1.1 $W/m^2.K$, with at least 85% of said gas filling, a light transmission ratio of at least 67% and a light reflection factor of below 18%.

30. A refrigerated display case according to claim 1, further comprising a spacer disposed between the glass substrates, the spacer comprising a first sealing barrier comprising a body made of thermoplastic polymer mixed with reinforcing fibres and a metal sheet at least partly covering the thermoplastic polymer, and a second sealing barrier against liquids and vapour.

31. A refrigerated display case according to claim 1, further comprising a spacer secured to the edges of the substrates, the spacer constituting also a sealing barrier against gases, dust and liquids.

32. A refrigerated display case comprising:

a refrigerated enclosure constructed and arranged to contain cold or frozen products;

a door constructed and arranged to seal the refrigerated enclosure when in a closed position, the door having a transparent insulating glazing unit comprising at least two glass substrates; and an antifrosting adsorbent layer disposed on a surface of a glass substrate facing an interior of the refrigerated enclosure, the antifrosting adsorbent layer being further an absorbent layer which is porous to allow condensation to absorb therein, wherein the transparent insulating glazing unit inhibits the formation of condensation on a surface of the glass substrate in contact with the ambient atmosphere and the antifrosting adsorbent layer inhibits the formation of water crystals on the surface of the glass substrate facing the interior of the refrigerated enclosure when the door is opened.

33. A refrigerated display case according to claim 1, wherein the insulating glazing unit has no heating element.

* * * * *